United States Patent
Xu

(10) Patent No.: US 11,263,750 B1
(45) Date of Patent: Mar. 1, 2022

(54) CYCLIC SCHEME FOR OBJECT SEGMENTATION NETWORKS

(71) Applicant: Adobe Inc., San Jose, CA (US)

(72) Inventor: Ning Xu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/086,012

(22) Filed: Oct. 30, 2020

Related U.S. Application Data

(60) Provisional application No. 63/088,327, filed on Oct. 6, 2020.

(51) Int. Cl.
  *G06K 9/62* (2006.01)
  *G06T 7/10* (2017.01)

(52) U.S. Cl.
  CPC ...... *G06T 7/10* (2017.01); *G06T 2207/20081* (2013.01); *G06T 2207/20084* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 10,275,892 | B2 * | 4/2019 | Bleibel | H04N 5/272 |
| 2018/0108169 | A1 * | 4/2018 | Miller | G06T 15/08 |
| 2019/0073780 | A1 * | 3/2019 | Iwase | G06T 7/337 |
| 2019/0325578 | A1 * | 10/2019 | Mohammad | G06T 7/194 |

OTHER PUBLICATIONS

Bansal, Aayush, et al., "Unsupervised video retargeting.", In European Conference on Computer Vision (ECCV), 2018.
Caelles, Sergi, et al., "One-shot video object segmentation", In Computer Vision and Pattern Recognition (CVPR), 2017.
Deng, J., et al., "ImageNet: A Large-Scale Hierarchical Image Database", Conference Paper in Proceedings / CVPR, IEEE Computer Society Conference on Computer Vision and Pattern Recognition. IEEE Computer Society Conference on Computer Vision and Pattern Recognition • Jun. 2009.
He, Kaiming, et al., "Deep residual learning for image recognition.", In the IEEE Conference on Computer Vision and Pattern Recognition (CVPR), Jun. 2016.
He, Kaiming, et al., "Mask r-cnn", In International Conference on Computer Vision (ICCV), 2018.

(Continued)

*Primary Examiner* — Quan M Hua
(74) *Attorney, Agent, or Firm* — Keller Jolley Preece

(57) ABSTRACT

Introduced here are computer programs and associated computer-implemented techniques for training and then applying computer-implemented models designed for segmentation of an object in the frames of video. By training and then applying the segmentation model in a cyclical manner, the errors encountered when performing segmentation can be eliminated rather than propagated. In particular, the approach to segmentation described herein allows the relationship between a reference mask and each target frame for which a mask is to be produced to be explicitly bridged or established. Such an approach ensures that masks are accurate, which in turn means that the segmentation model is less prone to distractions.

15 Claims, 11 Drawing Sheets
(5 of 11 Drawing Sheet(s) Filed in Color)

(56) References Cited

OTHER PUBLICATIONS

Hu, Yuan-Ting, et al., "Videomatch: Matching based video object segmentation.", In the European Conference on Computer Vision (ECCV), Sep. 2018.
Kingma, Diederik P., et al., "A method for stochastic optimization", Published as a conference paper at ICLR 2015.
Lin, Huaijia, et al., "Agss-vos: Attention guided single-shot video object segmentation", In the IEEE International Conference on Computer Vision (ICCV), Oct. 2019.
Lin, Tsung-Yi, et al., "Microsoft coco: Common objects in context", In European Conference on Computer Vision (ECCV), Zürich, 2014.
Luiten, Jonathon, et al., "Premvos: Proposal-generation, refinement and merging for video object segmentation", In Asian Conference on Computer Vision, 2018.
Meister, Simon, et al., "UnFlow: Unsupervised learning of optical flow with a bidirectional census loss.", In AAAI, New Orleans, Louisiana, Feb. 2018.
Oh, Seoung Wug, et al., "Fast video object segmentation by reference-guided mask propagation", In the IEEE Conference on Computer Vision and Pattern Recognition (CVPR), Jun. 2018.
Oh, Seoung Wug, et al., "Video object segmentation using space-time memory networks.", In the IEEE International Conference on Computer Vision (ICCV), Oct. 2019.
Perazzi, Federico, et al., "Learning video object segmentation from static images", In the IEEE Conference on Computer Vision and Pattern Recognition (CVPR), Jul. 2017.
Pont-Tuset, Jordi, et al., "The 2017 davis challenge on video object segmentation", arXiv:1704.00675, 2017.
Shi, J., et al., "Hierarchical image saliency detection on extended cssd", IEEE Transactions on Pattern Analysis and Machine Intelligence, 38(4):717-729, 2016.
Ventura, Carles, et al., "Rvos: End-to-end recurrent network for video object segmentation", In the IEEE Conference on Computer Vision and Pattern Recognition (CVPR), Jun. 2019.
Voigtlaender, Paul, et al., "Feelvos: Fast end-to-end embedding learning for video object segmentation", In the IEEE Conference on Computer Vision and Pattern Recognition (CVPR), Jun. 2019.
Voigtlaender, Paul, et al., "Online adaptation of convolutional neural networks for video object segmentation", In BMVC, Computer Vision Group Visual Computing Institute RWTH Aachen University Germany, 2017.
Wang, Xiaolong, et al., "Learning correspondence from the cycle consistency of time", In CVPR, 2019.
Xu, Ning, et al., "Youtube-vos: Sequence-to-sequence video object segmentation.", In the European Conference on Computer Vision (ECCV), Sep. 2018.
Zeng, Xiaohui, et al., "Differentiable mask-matching network for video object segmentation", The IEEE International Conference on Computer Vision (ICCV), Oct. 2019.
Zhu, Jun-Yan, et al., "Unpaired image-to-image translation using cycle-consistent adversarial networks.", In Computer Vision (ICCV), 2017 IEEE International Conference on, 2017.

\* cited by examiner

1000

1001
Obtain (i) a pair of frames arranged in a temporal order with a first frame preceding a second frame and (ii) a reference mask that defines, in the first frame, a boundary of an object to be located in the second frame

1002
Apply a segmentation model to the second frame to produce a first mask based on inputs including (i) the first frame and (ii) the reference mask

1003
Apply the segmentation model to the first frame to produce a second mask based on inputs including (i) the second frame and (ii) the first mask

1004
Calculate a metric to quantify similarity between the second mask and the reference mask

1005
Establish a correction factor based on the metric

1006
Apply the correction factor to the first mask to produce a third mask

Produce a first mask by applying a network-based model to a given digital image with (i) a reference digital image and (ii) a reference mask being provided as inputs

1102

Produce a second mask by applying the network-based model to the reference digital image with (i) the given digital image and (ii) the first mask being provided as inputs

1103

Update the network-based model based on a comparison of the second mask and the reference mask

FIGURE 11

CYCLIC SCHEME FOR OBJECT SEGMENTATION NETWORKS

CROSS-REFERENCE TO RELATED APPLICATIONS

This application claims priority to U.S. Provisional Application No. 63/088,327, titled "Semi-Supervised Video Object Segmentation Using Cyclic Mechanism" and filed on Oct. 6, 2020, which is incorporated herein by reference in its entirety.

TECHNICAL FIELD

Various embodiments concern computer programs and associated computer-implemented techniques for training and then applying computer-implemented models designed for segmentation.

BACKGROUND

Segmentation is a challenging computer vision task that involves partitioning a digital image into multiple sets of pixels to discover semantic objects (or simply "objects"). The goal of segmentation is to simplify and/or change the representation of a digital image into something that is more meaningful. Segmentation involves assigning labels to the pixels in a digital image such that pixels with the same label share at least one characteristic in common. A contiguous set of pixels having the same label may be representative of an object.

Segmentation has become increasingly popular due to its various applications in the areas of editing and analyzing videos. Among these applications, semi-supervised object segmentation is the most widely researched. In semi-supervised object segmentation, mask(s) are provided in the first frame of the video indicating the location and boundaries of the object(s), and then the underlying algorithms attempt to segment the same object(s) from the background in the following frames.

The frames of a video have traditionally been processed in a sequential order so that information from previous frames can be used to guide segmentation of the current frame. As such, conventional algorithmic pipelines (or simply "pipelines") follow a sequential order for segmentation in the training and inference stages. If masks predicted for intermediate frames are accurate enough, those masks can provide helpful information regarding object features and positioning prior to segmentation. On the other hand, if a prediction error exists in the intermediate frames, the problematic masks can mislead segmentation in all subsequent frames. FIG. 1 illustrates the risk of error propagation in sequential segmentation of objects in the frames of a video. Because the underlying algorithms are misled by another camel with similar visual characteristics in the background, the segmented background camel serves as erroneous guidance. Consequently, the underlying algorithms will gradually focus on the foreground and background camels in subsequent frames.

BRIEF DESCRIPTION OF THE DRAWINGS

This patent or application contains at least one drawing executed in color. Copies of this patent or application publication with color drawings will be provided by the Office upon request and payment of the necessary fee.

FIG. 10 depicts a flow diagram of a process for applying a trained segmentation model in a cyclical manner.

FIG. 11 is a flow diagram of a process in which a network-based model designed for segmentation is applied in the forward and backward directions to ensure that masks produced by the network-based model are accurate.

Figure 1:
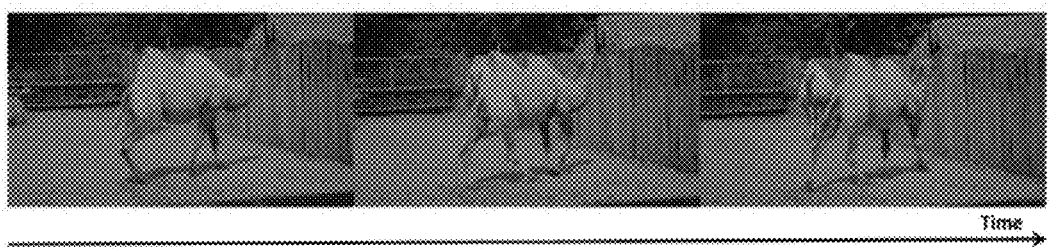
FIG. 1 illustrates the risk of error propagation in sequential segmentation of objects in the frames of a video.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Introduced here are computer programs and associated computer-implemented techniques for training and then applying computer-implemented models (or simply "models") designed for segmentation of an object in the frames of video. A segmentation model may be comprised of a series of algorithms that are trained to identify an object in a target frame (also referred to as the "objective frame") using a reference mask that defines the bounds of the object in a reference frame. This series of algorithms may be referred to as a "neural network" or "network." By training and then applying the segmentation model in a cyclical manner, the errors encountered when performing segmentation can be eliminated rather than propagated. In particular, the approach to segmentation described herein allows the relationship between the reference mask and each target frame for which a mask is to be produced to be explicitly bridged or established. Such an approach ensures that masks are accurate, which in turn means that the segmentation model is less prone to distractions (e.g., additional background objects) since the segmentation model can learn object representation of cross-frame correspondence.

To address the drawbacks of the sequential approaches described above, a video editing platform (or simply "editing platform") may apply a forward-backward flow to form a cyclic structure for a segmentation model. The corresponding network can be trained at the reference and target frames to help the model learn the correspondence relationship the reference mask provided to the segmentation model as input and the predicted mask produced by the segmentation model as output. During the inference stage, the editing platform may selectively refine the predicted mask based on the gradient backward from the reference frame, as further discussed below. In this way, the editing platform can naturally extend the segmentation model that was trained offline to an online scheme with marginal time latency increments.

Moreover, the editing platform may employ a receptive field visualization approach, referred to as "Cycle Effective Receptive Field" or "Cycle-ERF," in which an empty mask is gradually updated to show the stronger response area(s) with respect to the reference mask. As further discussed below, this approach is inspired by the process of gradient correction. Cycle-ERF may be useful in understanding how a cyclic approach to training affects the support regions of objects. Said another way, Cycle-ERF may provide a means for visual analysis of how networks designed for segmentation extract regions of interest based on reference masks.

Embodiments may be described with reference to particular types of objects, models, computer programs, etc. However, those skilled in the art will recognize that these features are similarly applicable to other objects, models, computer programs, etc. For example, while embodiments may be described in the context of segmenting digital images that represent frames in a video, those embodiments could be extended to a series of digital images that are generated (e.g., by a mobile phone or digital camera) in rapid succession. As another example, embodiments may be described in the context of two-dimensional digital images; however, these embodiments could be extended to three-dimensional digital images, such as those used in autonomous driving and medical applications.

While embodiments may be described in the context of computer-executable instructions, aspects of the technology can be implemented via hardware, firmware, or software. As an example, a set of algorithms representative of a model designed for segmentation may be executed by an editing platform. The editing platform could be embodied using software that is executable by a computing device, or the editing platform could be embodied using special-purpose hardware (e.g., circuitry) that is implementable in a computing device.

Related Work in Segmentation

A. Semi-Supervised Video Object Segmentation

Object segmentation has been widely researched due to the ongoing development of deep learning methods. Various models have been developed as part of this research. These models can be divided into online methods and offline methods.

One example of an online method called OSVOS was provided by Sergi Caelles et al. in "One-Shot Video Object Segmentation," *Computer Vision and Pattern Recognition (CVPR)*, 2017. OSVOS was the first online method to exploit deep learning to deal with object segmentation in the context of video, where a multistage training strategy is designed to gradually shrink the focus of the network from general objects to the ones in reference masks. Another example called OnAVOS was provided by Paul Voigtlaender et al. in "Online Adaptation of Convolutional Neural Networks for Video Object Segmentation," *British Machine Vision Conference (BMVC)*, 2017. OnAVOS sought to improve the online learning process with an adaptive mechanism. Another example called MaskTrack was provided by Federico Perazzi et al. in "Learning Video Object Segmentation From Static Images," *IEEE Conference on Computer Vision and Pattern Recognition (CVPR)*, July 2017. MaskTrack involves introducing extra static image data with mask annotation and then generating synthesized data through affine transformation to tune the network before inference. All of these online methods require explicit parameter updates during inference, however. And while these online methods tend to achieve high performance, these online methods are time consuming with frames per second (FPS) measures of less than one that make them unsuitable for practical deployment.

On the other hand, there are a number of offline methods that are deliberately designed to learn generalized correspondence between features. These offline methods do not require an online learning component during the inference stage. One example of an offline method called reference-guided mask propagation (RGMP) was provided by Seoung Wug Oh et al. in "Fast Video Object Segmentation By Reference-Guided Mask Propagation," *IEEE Conference on Computer Vision and Pattern Recognition (CVPR)*, June 2018. RGMP relies on an hourglass-shaped network structure with skip connections to predict a mask based on the current frame and previous information. Another example called S2S proposed modeling video object segmentation as a sequence-to-sequence problem and implement temporal modeling to enhance the temporal coherence of mask propagation. This offline method was described by Ning Xu et al. in "YouTube-VOS: Sequence-to-Sequence Video Object Segmentation," *European Conference on Computer Vision (ECCV)*, September 2018. Meanwhile, FEELVOS and AGSS-VOS rely on exploiting guidance from the reference mask and previous frame to enhance segmentation accuracy with a deliberately designed feature matching scheme and an attention mechanism, respectively. FEELVOS was described by Paul Voigtlaender et al. in "FEELVOS: Fast End-to-End Embedding Learning for Video Object Segmentation," *IEEE Conference on Computer Vision and Pattern Recognition (CVPR)*, June 2019, and AFSS-VOS was described by Huaijia Lin et al. in "AGSS-VOS: Attention Guided Single-Shot Video Object Segmentation," *IEEE International Conference on Computer Vision (ICCV)*, October 2019. Compared with online methods, these offline methods are more efficient from a resource perspective. However, to learn more general and robust feature correspondence, these offline methods require significant amounts of data. Said another way, these offline methods are "data hungry," requiring models trained on extra data with mask annotations in other tasks such as instance segmentation or saliency detection. Otherwise, these offline methods might be disrupted by distraction from similar objects in the video and then propagate erroneous mask information to future frames.

B. Cycle Consistency

Cycle consistency has been widely researched in unsupervised and semi-supervised learning. Where a transformation and its inverse operation are applied sequentially, consistency requires that the output should be close to the original input in feature space. Cycle consistency can be applied to different types of correspondence-related tasks. As an example, Xiaolong Wang et al. combined patch-wise consistency with a weak tracker to construct a forward-backward data loop to guide a network to learn representative features across different intervals of time in "Learning Correspondence from the Cycle Consistency of Time," *Computer Vision and Pattern Recognition (CVPR)*, 2019. As another example, Simon Meister et al. exploited the cycle consistency in unsupervised optical flow estimation by designing a bidirectional consensus loss during training in "UnFlow: Unsupervised Learning of Optical Flow with a Bidirectional Census Loss," *Association for the Advancement of Artificial Intelligence (AAAI)*, February 2018. On the other hand, Cycle-GAN and Recycle-GAN utilize cycle training to learn nontrivial cross-domain mapping that enables image-to-image transformation across different domains. Cycle-GAN is described by Jun-Yan Zhu et al. in "Unpaired Image-to-Image Translation Using Cycle-Consistent Adversarial Networks," *IEEE International Conference on Computer Vision (ICCV)*, 2017, while Recycle-GAN is described by Aayush Bansal et al. in "Recycle-GAN: Unsupervised Video Retargeting," *European Conference on Computer Vision (ECCV)*, 2018.

The approach described in the present disclosure differs from the above-mentioned work in several respects. First, cycle consistency is incorporated into training of a network in a fully supervised manner that does not require large amounts of unlabeled data. Second, the cyclic structure implemented by the editing platform is not only applied during the training stage, but could also be applied during the inference stage.

Overview of Cyclic Approach to Segmentation

Suppose that a video is of length T, $X_t$ is the t-th frame ($t \in [1, T]$) in temporal sequential order while $Y_t$ is the corresponding mask. $S_\theta$ is an object segmentation network (or simply "network") parameterized by learnable weights $\theta$. In terms of the sequential processing order of the video, the network should achieve the function as follows:

$$\hat{Y}_t = S_\theta(X_{t-1}, \mathcal{Y}_{t-1}, X_t) t \in [2,T],  \quad \text{Eq. 1}$$

where $\hat{Y}_t$ denotes the predicted mask at the t-th frame. $X_{t-1} \subset \{X_i | i \in [1, t-1]\}$ is the reference frame set, which is a subset of all frames appearing before the objective frame $X_t$ that is of interest. Similarly, $\mathcal{Y}_{t-1}$ is a set containing reference masks corresponding to the frames in $X_{t-1}$. However, in a semi-supervised setting, only the initial reference mask for the first frame is available. Accordingly, the corresponding predicted mask $Y_t$ may be used as an approximation of the initial reference mask, which means $\mathcal{Y}_{t-1} \subset \{Y_1\} \cup \{\hat{Y}_i | i \in [2, t-1]\}$.

A. Cycle Consistency Loss

Figure 2:
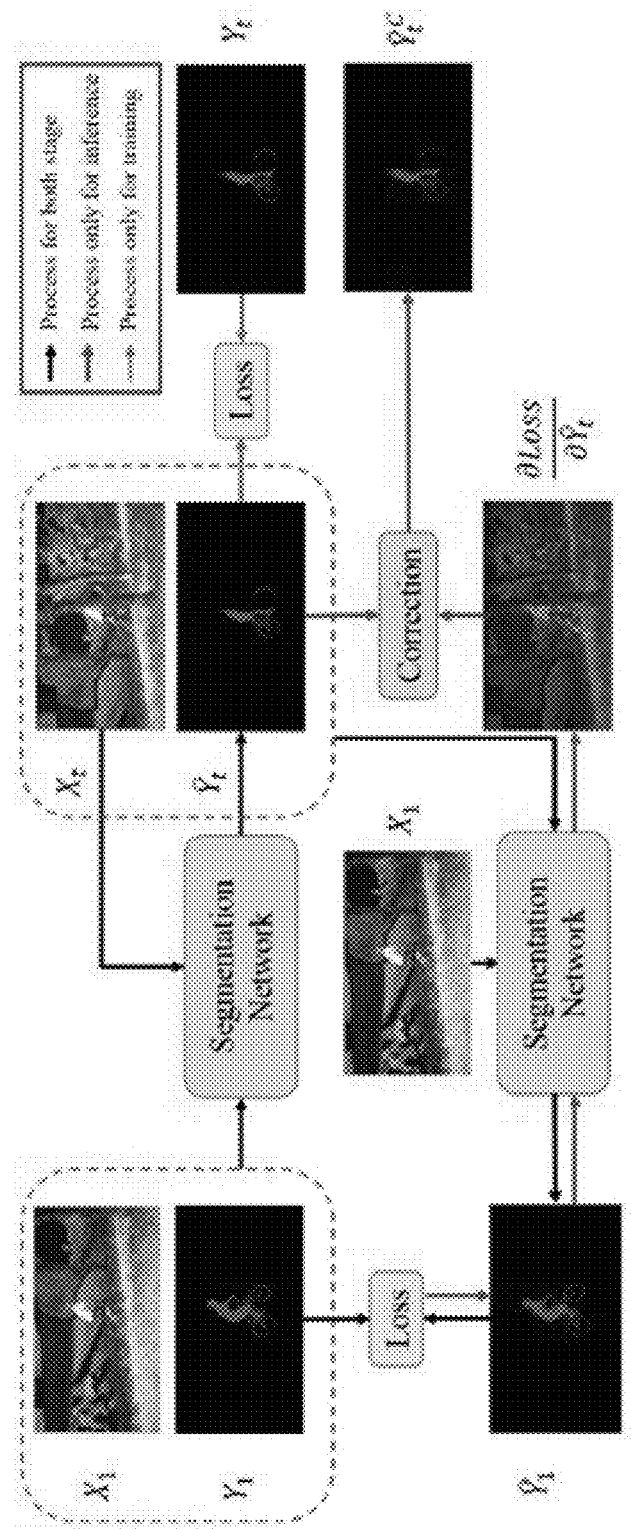
FIG. 2 is a high-level illustration of an approach in which a cyclic structure has been incorporated into the training and inference stages of object segmentation.

For the sake of mitigating error propagation during training, a cyclic aspect can be incorporated into the offline training process to explicitly bridge the correlation between the initial reference mask and each predicted mask. FIG. 2 is a high-level illustration of an approach in which a cyclic structure has been incorporated into the training and inference stages of object segmentation. Said another way, FIG. 2 provides an overview of the cyclic structure in the training and inference stages of a network designed for segmentation. For simplicity, the cyclic structure will be described in the situation where $X_{t-1} = \{X_1\}$, $\mathcal{Y}_{t-1} = \{Y_1\}$, $\hat{X}_t = \{X_t\}$, and $\mathcal{\hat{Y}}_t = \{\hat{Y}_t\}$. However, those skilled in the art will recognize that this need not be the case.

As shown in FIG. 2, after obtaining the predicted mask $\hat{Y}_t$ at frame t, cyclic reference sets (or simply "reference sets") for the frames and masks can be constructed. The reference frame set may be represented as $\hat{X}_t \subset \{X_i | i \in [2, t]\}$, while the reference mask set may be represented as $\mathcal{\hat{Y}}_t \subset \{Y_i | i \in [2, t]\}$.

With the reference sets, a prediction for the initial reference mask can be obtained through the same manner as sequential processing, namely:

$$\hat{Y}_1 = S_\theta(\hat{X}_t, \mathcal{\hat{Y}}_t, X_1). \quad \text{Eq. 2}$$

Consequently, mask reconstruction loss for supervision can be applied on both the output t-th frame and the backward predicted mask $\hat{Y}_1$ as follows:

$$\mathcal{L}_{cycle,t} = \mathcal{L}(\hat{Y}_t, Y_t) + \mathcal{L}(\hat{Y}_1, Y_1). \quad \text{Eq. 3}$$

As further discussed below, one or more metrics may be used to facilitate supervision at one or both sides of the cyclic loop. Examples of such metrics include Intersection over Union (IoU) and cross-entropy loss. When IoU and cross-entropy loss are accounted for, the reconstruction loss can be formulated as:

$$\mathcal{L}(\hat{Y}_t, Y_t) = \frac{1}{|\Omega|} \sum_{u \in \Omega} \left((1 - Y_{t,u})\log(1 - \hat{Y}_{t,u}) + Y_{t,u} \log(\hat{Y}_{t,u})\right) - \gamma \frac{\sum_{u \in \Omega} \min(\hat{Y}_{t,u}, Y_{t,u})}{\sum_{u \in \Omega} \max(\hat{Y}_{t,u}, Y_{t,u})}, \quad \text{Eq. 4}$$

where $\Omega$ denotes the set of all pixel coordinates in the mask, $Y_{t,u}$ and $\hat{Y}_{t,u}$ are the normalized pixel values at coordinate u of the mask, and $\gamma$ is a parameter for controlling the balance between the two loss components. Those skilled in the art will recognize that the reconstruction loss may be calculated differently if other metrics are used, or if more or less than two metrics are used. Note that the cyclic structure shown in FIG. 2 involves indirectly applying data augmentation on training data by reversing the input clips in temporal order, thereby helping the network learn more general feature correspondence.

B. Gradient Correction

After completing the training stage with the cyclic loss shown in Eq. 3, the offline model can be directly applied by an editing platform in the inference stage. However, inspired by the cyclic structure in the training stage, the editing platform may take the initial reference mask as a measurement to evaluate the segmentation quality of the current frame and then refine the output (e.g., the predicted mask) based on the results of the evaluation. In this way, the editing platform can explicitly reduce the effect of error propagation during the inference stage.

To achieve this, the editing platform can design and/or implement a gradient correction block (also referred to as a "gradient correction module") to iteratively update segmentation results as shown in FIG. 2. Since only the initial reference mask $Y_1$ is available in the inference stage, the editing platform can apply the predicted mask $\hat{Y}_t$ to predict the initial reference mask in the same manner as Eq. 2. Then, the editing platform can evaluate the segmentation quality of the predicted mask $\hat{Y}_t$ with the loss function of Eq. 4. Intuitively, a more accurate predicted mask $\hat{Y}_t$ will result in less reconstruction error for the initial reference mask $Y_1$, therefore, the gradient descent approach is adopted to refine the predicted mask $\hat{Y}_t$. More specifically, the editing platform can start from an output mask $\hat{Y}_t^0 = \hat{Y}_t$ and then update the output mask for N iterations as follows:

$$\hat{Y}_t^{l+1} = \hat{Y}_t^l - \alpha \frac{\partial \mathcal{L}(S_\theta(\{X_t\}, \{\hat{Y}_t^l\}, X_1, Y_1)}{\partial \hat{Y}_t^l} \quad \text{Eq. 5}$$

where α is a predefined correction rate for mask updates. After N iterations, the editing platform can take the output mask $\hat{Y}_t^N$ as the final segmentation. With this iterative refinement, the offline model can be naturally extended to an online model. However, gradient correction can be time consuming since it requires multiple instances of forward-backward passes by the network. For this reason, the editing platform may only perform gradient correction once per K frames to achieve good performance while limiting consumption of resources and delays. For example, the editing platform may only perform gradient correction once every 3 frames, 5 frames, or 10 frames. Alternatively, frames may be selected in a random or semi-random manner so that frames are not selected evenly across N frames. Instead, the editing platform may select frames whose mask predictions have errors exceeding a threshold. Thus, the editing platform may continually compare mask predictions against a predetermined threshold and then identify those frames corresponding to mask predictions that exceed the threshold. The predetermined threshold may be based on, for example, the amount of available computation resources and desired quality of mask predictions. Such an approach allows the editing platform to ensure that errors are limited while limiting consumption of computation resources.

C. Cycle-ERF

The cyclic structure with gradient correction shown in Eq. 5 is not only helpful for refinement of the predicted mask output by the network of the segmentation model, but also provides a new aspect of analysis in the region of interests of the pretrained network to segment specific objects. Initially, the editing platform can construct a reference set as $\mathcal{X}_I = \{X_I\}$ and $\mathcal{Y}_I = \{0\}$ as the guidance, wherein 0 denotes an empty mask of the same size as $X_I$ but filled with zeros.

The editing platform can use the reference set to identify objects at the t-th frame by generating a corresponding mask $\hat{Y}_t$. In this way, the editing platform can obtain the reconstruction loss $\mathcal{L}(\hat{Y}_t, Y_t)$. To minimize this loss, the editing platform can perform gradient correction using Eq. 5 to gradually update the empty mask for M iterations. The number of iterations (M) could be, for example, 10, 25, 50, or 100. Finally, the editing platform can employ a rectifier to preserve the positive-related area towards the predicted mask as the final Cycle-ERF representation as shown below:

$$\text{Cycle-ERF}(Y_I) = \text{ReLU}(\hat{Y}_I^M). \qquad \text{Eq. 6}$$

The editing platform may include, or have access to, a rectified linear unit (ReLU) that is able to apply the rectifier, which is an activation function for networks. As can be seen below in the experimental results, the Cycle-ERF can properly reflect the support region for segmentation of specific objects, while reflecting how concentrated the pretrained segmentation model is on certain objects.

D. Experimental Setup and Results

The cyclic approach to segmentation was trained and then evaluated on two widely used benchmarks for semi-supervised video object segments, DAVIS17 and YouTube-VOS. DAVIS17 contains 120 video sequences in total with at most 10 objects in each video sequence. The dataset is spit into 60 video sequences for training, 30 video sequences for validating, and 30 video sequences for testing. YouTube-VOS is larger in scale and contains more objects in different categories. In the YouTube-VOS dataset, there are 3,471 video sequences for training and 474 video sequences for validating with at most 12 objects in each video sequence.

A hybrid training set was constructed by mixing data from these training sets. For simplicity, the network of the segmentation model described herein was trained without extra data from instance segmentation tasks in all experiments. Further, the results of other approaches with pretraining using the YouTube-VOS dataset were reported, if available.

For evaluation on the validating and testing datasets of DAVIS17, the metric in the standard DAVIS evaluation protocol was adopted. Further information regarding the standard DAVIS evaluation protocol is provided by Jordi Pont-Tuset et al. in "The 2017 DAVIS Challenge on Video Object Segmentation," arXiv:1704.00675, 2017. The Jaccard overlap $\mathcal{J}$ (also referred to as the "Jaccard index") was adopted to evaluate the mean IoU between the predicted mask and reference mask. The contour F-score $\mathcal{F}$ computed the F-measurement in terms of the contour-based precision and recall rate. The final score was obtained from the average value of $\mathcal{J}$ and $\mathcal{F}$. The evaluation on YouTube-VOS followed the same rules except that the two metrics were computed on seen and unseen objects, respectively, and then averaged together.

The Space Time Memory Network (STMN) was implemented as the baseline model due to its flexibility in adjusting the reference sets $\mathcal{X}_t$ and $\mathcal{Y}_t$. Further information regarding the STMN is provided by Seoung Wug Oh et al. in "Video Object Segmentation Using Space-Time Memory Networks," *IEEE International Conference on Computer Vision (ICCV)*, October 2019. However, in order to adapt to the time-consuming gradient correction process, efforts were taken to "lighten" the design by reducing the intermediate feature dimension, resizing the input to half of the original work, and then upsampling the output to the original size with nearest interpolation. For ease of representation, the segmentation model trained using a cyclic structure is labeled as "STM-Cycle" in Tables I-IV.

Within an epoch, for each video sequence, 3 frames were randomly sampled as a training sample, and the frame with the earliest timestamp was regarded as the initial reference frame. The maximum temporal interval of sampling was increased by 5 every 20 epochs. The parameters were set as $\gamma=1.0$, N=10, K=5, and M=50. ResNet-50 pretrained on the ImageNet database was adopted as the backbone for the baseline model. The network was trained with a batch size of 4 for 240 epochs in total and then optimized by the Adam optimization algorithm at a learning rate of 10-5 with $\beta_1=0.9$ and $\beta_2=0.999$. In the training and inference stages, the inputs were resized to the resolution of 240×427. Meanwhile, the final output was upsampled to the original resolution with nearest interpolation. For simplicity, $X_t$ and $\hat{Y}_t$ were used to construct the reference sets.

The evaluation results on DAVIS17 are reported in Table I. As can be seen in Table I, the segmentation model trained with a cyclic structure outperforms all offline methods and even performs better than online methods. When combined with the gradient correction process, success is further boosted. Although these is a performance gap between the segmentation model and some state-of-the-art online learning methods, the approach described herein is much more efficient and does not require additional training data from instance segmentation tasks. In terms of runtime speed, while gradient correction increases the computational cost, the segmentation model still runs at a comparable speed as other offline methods due to its efficient implementation.

TABLE I

Comparison with various methods on DAVIS17 dataset. "Extra data" indicates that the corresponding method was pretrained with extra data with mask annotation, and "—" indicates that results were not readily available via public resources.

| Method | Extra Data | Online | $\mathcal{J}$ (%) | $\mathcal{F}$ (%) | $\mathcal{J}$ & $\mathcal{F}$ (%) | FPS |
|---|---|---|---|---|---|---|
| Validation | | | | | | |
| VideoMatch | | | 56.5 | — | — | 3.1 |
| RGMP | ✓ | | 64.8 | 68.6 | 66.7 | 3.6 |
| DMM-Net | ✓ | | 68.1 | 73.3 | 70.7 | — |
| AGSS-VOS | ✓ | | 64.9 | 69.9 | 67.4 | 10 |
| FEELVOS | ✓ | | 69.1 | 74.0 | 71.5 | 2 |
| OnAVOS | ✓ | ✓ | 61.0 | 66.1 | 63.6 | 0.04 |
| PReMVOS | ✓ | ✓ | 73.9 | 81.7 | 77.8 | 0.03 |
| STM-Cycle | | | 68.7 | 74.7 | 71.7 | 38 |
| STM-Cycle + GC | | ✓ | 69.3 | 75.3 | 72.3 | 9.3 |
| Test-Dev | | | | | | |
| RVOS | | | 48.0 | 52.6 | 50.3 | 22.7 |
| RGMP | ✓ | | 51.3 | 54.4 | 52.8 | 2.4 |
| AGSS-VOS | ✓ | | 54.8 | 59.7 | 57.2 | 10 |
| FEELVOS | ✓ | | 55.2 | 60.5 | 57.8 | 1.8 |
| OnAVOS | ✓ | ✓ | 53.4 | 59.6 | 56.9 | 0.03 |
| PReMVOS | ✓ | ✓ | 67.5 | 75.7 | 71.6 | 0.02 |
| STM-Cycle | | | 55.1 | 60.5 | 57.8 | 31 |
| STM-Cycle + GC | | ✓ | 55.3 | 62 | 58.6 | 6.9 |

The evaluation results on YouTube-VOS are reported in Table II. As can be seen in Table II, the segmentation model trained with a cyclic structure outperforms some offline methods and the online learning counterparts. It is also noticeable that compared with the performance on seen objects, unseen objects can be identified with greater accuracy when gradient correction is performed.

TABLE II

Comparison with various methods on YouTube-VOS dataset. S and U denote the seen and unseen categories, while g represents the global mean.

| Method | Extra Data | Online | $\mathcal{J}_s$ (%) | $\mathcal{J}_u$ (%) | $\mathcal{F}_s$ (%) | $\mathcal{F}_u$ (%) | $\mathcal{G}$ (%) | FPS |
|---|---|---|---|---|---|---|---|---|
| RVOS | | | 63.6 | 45.5 | 67.2 | 51.0 | 56.8 | 24 |
| S2S | | | 66.7 | 48.2 | 65.5 | 503 | 57.6 | 6 |
| RGMP | ✓ | | 59.5 | — | 45.2 | — | 53.8 | 7 |
| DMM-Net | ✓ | | 58.3 | 41.6 | 60.7 | 46.3 | 51.7 | 12 |
| AGSS-VOS | ✓ | | 71.3 | 65.5 | 75.2 | 73.1 | 71.3 | 12.5 |
| S2S | | ✓ | 71.0 | 55.5 | 70.0 | 61.2 | 64.4 | 0.06 |
| OSVOS | ✓ | ✓ | 59.8 | 54.2 | 60.5 | 60.7 | 58.8 | — |
| MaskTrack | ✓ | ✓ | 59.9 | 45.0 | 59.5 | 47.9 | 53.1 | 0.05 |
| OnAVOS | ✓ | ✓ | 60.1 | 46.6 | 62.7 | 51.4 | 55.2 | 0.05 |
| DMM-Net | ✓ | ✓ | 60.3 | 50.6 | 63.5 | 57.4 | 58.0 | — |
| STM-Cycle | | | 71.7 | 61.4 | 75.8 | 70.4 | 69.9 | 43 |
| STM-Cycle + GC | | ✓ | 72.2 | 62.8 | 76.3 | 71.9 | 70.8 | 13.8 |

E. Ablation Study

Ablation studies were also conducted to analyze the impact of different components on the network of the segmentation model trained with the cyclic structure. All of the experiments were conducted on the validation segment of the DAVIS17 dataset.

First, the effectiveness of cyclic training and gradient correction was demonstrated as shown in Table III, where the baseline model was implemented and then retrained. As can be seen in Table III, both aspects were helpful in boosting performance. In particular, incorporating cyclic training improved the contour score F more than the overlap, indicating that the approach described herein is helpful for more fine-grained mask predictions.

TABLE III

Ablation study on the effectiveness of the cyclic structure and gradient correction ("GC").

| | $\mathcal{J}$ (%) | $\mathcal{F}$ (%) | $\mathcal{J}$ & $\mathcal{F}$ (%) |
|---|---|---|---|
| Baseline | 67.6 | 71.7 | 69.7 |
| + Cyclic | 68.7 | 74.7 | 71.7 |
| + Gradient Correction | 68.2 | 72.9 | 70.5 |
| + Cyclic and Gradient Correction | 69.3 | 75.3 | 72.3 |

Due to the flexibility of the baseline model in configuring its reference sets during the inference stage, the impact of cyclic training on performance can be tested with different reference sets. Impact was studied under four types of configuration: (1) where only the initial reference mask $\hat{Y}_1$ and its frame are utilized for prediction of masks for other frames; (2) where only the mask $\hat{Y}_{t-1}$ predicted for the last frame and the last frame are utilized; (3) where the initial reference mask $\hat{Y}_1$ and last predicted mask $\hat{Y}_{t-1}$ are utilized; and (4) where an external memory strategy—denoted as MEM—is utilized. In MEM, the reference set is dynamically updated by appending new predicted masks and corresponding frames at a specific frequency (e.g., 5 Hz). The results of these studies can be found in Table IV, which shows that cyclic training is helpful under all configurations. Note that cyclic training results in the maximum improvement (+4.6 $\mathcal{J}$ & $\mathcal{F}$) with the configuration $\mathcal{X}_{t-1}=\{X_{t-1}\}$, $\mathcal{Y}_{t-1}=\{\hat{Y}_{t-t}\}$, which is the case that is most vulnerable to error propagation.

TABLE IV

Experiments on improvement of $\mathcal{J}$ & $\mathcal{F}$ score with different reference set configurations.

| $\mathcal{X}_{t-1}$ | $\mathcal{Y}_{t-1}$ | Baseline | + Cyclic | Delta (Δ) |
|---|---|---|---|---|
| $\{X_1\}$ | $\{Y_1\}$ | 65.2 | 67.6 | +2.4 |
| $\{X_{t-1}\}$ | $\{\hat{Y}_{t-1}\}$ | 56.8 | 61.2 | +4.6 |
| $\{X_t, X_{t-1}\}$ | $\{Y_t, \hat{Y}_{t-1}\}$ | 67.3 | 69.2 | +1.9 |
| MEM | MEM | 69.7 | 71.7 | +2.0 |

Figure 3:
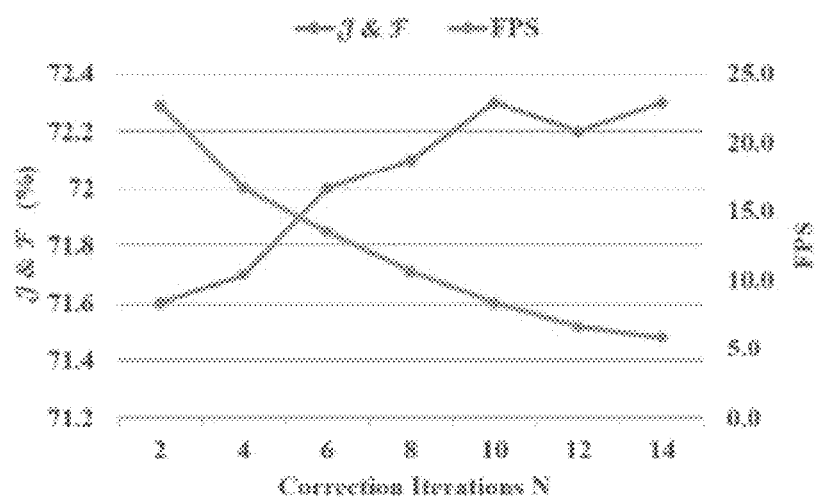
FIG. 3 illustrates the tradeoff of performance versus runtime with respect to the correction iteration time.

Finally, analysis was performed to establish how the parameters of the network of the segmentation model affected the final results. FIG. 3 illustrates the tradeoff of performance versus runtime with respect to the correction iteration time N. As can be seen in FIG. 3, the $\mathcal{J}$ & $\mathcal{F}$ score converges quickly once N reaches 10, at which point the improvement is marginal while efficiency as measured in frames per second (FPS) continued to drop. Accordingly, N=10 may be used as the iteration number for gradient correction.

Figure 4:
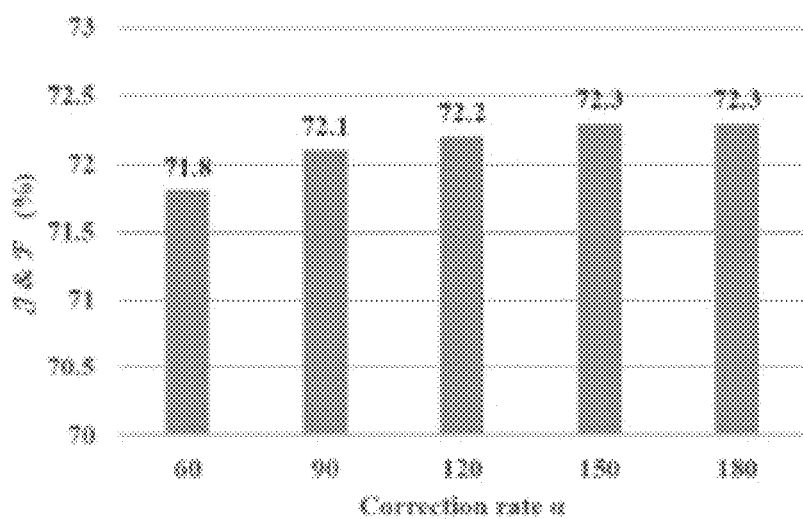
FIG. 4 illustrates how performance variation of the segmentation model described herein is not sensitive to changes in the correction rate.

Additionally, the impact of the correction rate α on the final results was studied. FIG. 4 illustrates how performance variation is not sensitive to changes in the correction rate α, reflecting that the approach described herein is robust and can accommodate variations in this parameter.

F. Quantitative Results

Figure 5:
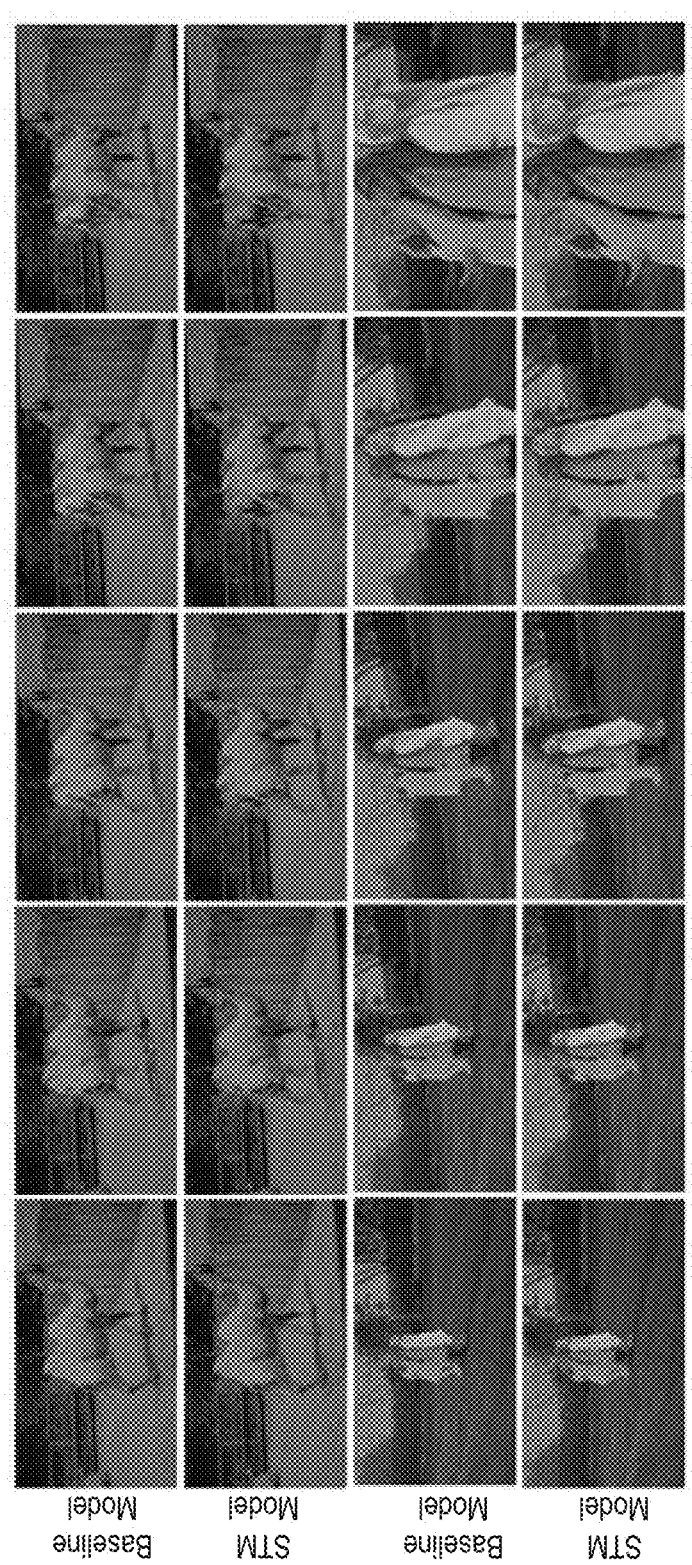
FIG. 5 includes qualitative results of several frames showing the improvement of cyclic training over a baseline model.

FIG. 5 includes some segmentation results using a segmentation model trained with and without a cyclic structure. Each row is representative of a video sequence, while the columns represent different frames in the corresponding video sequence. As can be seen by comparing the first two rows, the cyclic scheme suppresses the accumulative error from problematic reference masks. In the second row, the segmentation model was able to depict the boundaries between the foreground objects more precisely, which is consistent with the quantitative results discussed above. The cyclic process may also be useful for successfully segmenting small objects that have historically been challenging to properly segment. As can be seen in the last two rows of FIG. 5, for example, the segmentation model was able to identify an object held in the hand of the leftmost women while this object was ignored by the baseline model.

Figure 6:
FIG. 6 includes visualizations for the Cycle-ERF of several frames with respect to the initial reference mask.

The Cycle-ERF defined in Eq. 6 was also analyzed on different approaches. To accomplish this, the initial reference mask was taken as the object to be predicted and a random intermediate frame and empty mask were taken as the reference. FIG. 6 includes visualizations for the Cycle-ERF of several frames with respect to the initial reference mask. Compared with the baseline mode, the cyclic scheme helps the network of the segmentation model concentrate more on the foreground objects with a stronger response. This indicates that the segmentation model has learned more robust object-specific correspondence. Note also that only a small part of each object is crucial for reconstructing the same objects in the initial frame. The overall receptive field instead focuses on the outline or skeleton of those objects. This can help explain the improvement in contour accuracy with the cyclic scheme, and also provide cues on the design to extract more informative feature(s) from reference masks.

Overview of Editing Platform

An editing platform may be responsible for implementing a model designed for segmentation in a cyclical manner. As mentioned above, this could be done during the training stage and/or inference stage. At a high level, a segmentation model is comprised of a series of algorithms that can be trained to identify an object in a target frame based on a reference mask that defines the bounds of the object in a reference frame. This series of algorithms may be referred to as a "neural network" or "network."

For the purpose of illustration, the reference frame may be described as a "first frame" in a video while the target frame may be described as a "second frame" in the video. Those terms are intended to refer to the temporal order in which those frames are shown in the video. The first and second frames may be directly adjacent to one another in the video, or frame(s) may be interposed between the first and second frames.

Figure 7:
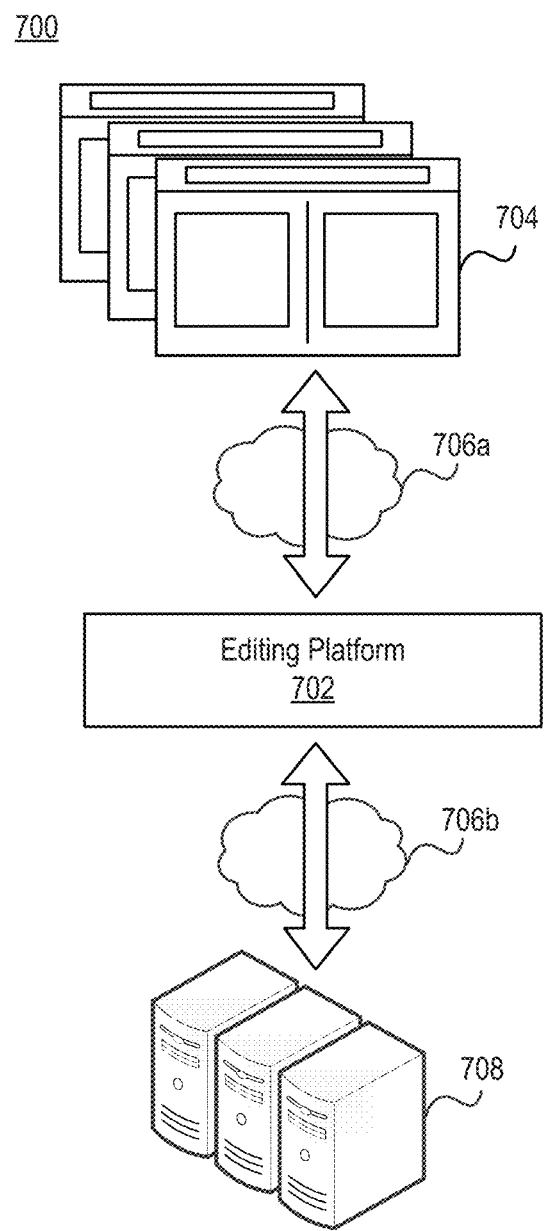
FIG. 7 illustrates a network environment that includes an editing platform able to execute instructions for incorporating a cyclic mechanism into the computer vision task of video object segmentation.

FIG. 7 illustrates a network environment 700 that includes an editing platform 702 able to execute instructions for incorporating a cyclic mechanism into the computer vision task of video object segmentation (or simply "segmentation"). As further discussed below, the cyclic mechanism can be incorporated into offline training of the network of a segmentation model. Then, the segmentation model can then be extended to an online method by introducing gradient correction. As further discussed below, the editing platform 702 may be comprised of a series of modules operable to obtain a reference mask that defines, in a reference frame, a boundary of an object, locate a segmentation model to be trained to identify instances of the object, and then train the segmentation model. To train the segmentation model, the editing platform 702 may apply the segmentation model to a target frame to produce a first mask based on inputs including (i) the reference frame and (ii) the reference map, apply the segmentation model to the reference frame to produce a second map based on inputs including (i) the target frame and (ii) the first map, and then update the segmentation model based on a comparison of the second mask and the reference mask. The term "module" refers broadly to software components, firmware components, and/or hardware components. Accordingly, aspects of the editing platform 702 could be implemented in software, firmware, and/or hardware.

As shown in FIG. 7, individuals can interface with the editing platform 702 via interfaces 704. An example of an editing platform is a timeline-based video editing program that is designed for professionals or novices. The editing platform 702 may be responsible for creating the interfaces through which videos can be created, edited, viewed, imported, and exported. Similarly, the editing platform 702 may be responsible for creating the interfaces through which an individual can apply effects, specify preferences, integrate other programs, etc.

In some embodiments, the video to be segmented is created and/or modified through the editing platform 702. In other embodiments, the video to be segmented is uploaded to the editing platform 702. For example, an individual may access the editing platform 702 and then select, via an interface generated by the editing platform 702, a video from a memory, cause a segmentation model to be applied to some or all of the frames, and view outputs, if any, produced by the segmentation model.

As noted above, the editing platform 702 may reside in a network environment 700. Thus, the editing platform 702 may be connected to one or more networks 706*a-b*. The network(s) 706*a-b* can include personal area networks (PANs), local area networks (LANs), wide area networks (WANs), metropolitan area networks (MANs), cellular networks, the Internet, etc. Additionally or alternatively, the editing platform 702 can be communicatively connected to computing device(s) over a short-range wireless connectivity technology, such as Bluetooth®, Near Field Communication (NFC), Wi-Fi® Direct (also referred to as "Wi-Fi P2P"), and the like.

The interfaces 704 may be accessible via a web browser, desktop application, mobile application, or over-the-top (OTT) application. Accordingly, the interfaces 704 may be viewed on a personal computer, tablet computer, mobile phone, wearable electronic device (e.g., a watch or fitness accessory), network-connected ("smart") electronic device, (e.g., a television or home assistant device), virtual/augmented reality system (e.g., a head-mounted display), or some other electronic device.

In some embodiments, at least some components of the editing platform 702 are hosted locally. That is, part of the editing platform 702 may reside on the computing device used to access one of the interfaces 704. For example, the editing platform 702 may be embodied as a desktop application executing on a personal computer. Note, however, that the desktop application may be communicatively connected to a network-accessible resource. Examples of network-accessible resources include private storage mediums (e.g., those maintained by enterprises or individuals), private cloud infrastructures, and public cloud infrastructures. The network-accessible resource may host other components of the editing platform 702, or the network-accessible resource may host content, such as videos, that can be used by the editing platform 702.

In other embodiments, the editing platform 702 is executed entirely by a cloud computing service operated by, for example, Amazon Web Services® (AWS), Google Cloud Platform™, or Microsoft Azure®. In such embodiments, the editing platform 702 may reside on a network-accessible server system 708 comprised of one or more computer servers. These computer server(s) can include different types of data (e.g., videos, masks, processing algorithms, segmentation models), user information (e.g., profiles and credentials), and other assets.

Figure 8:
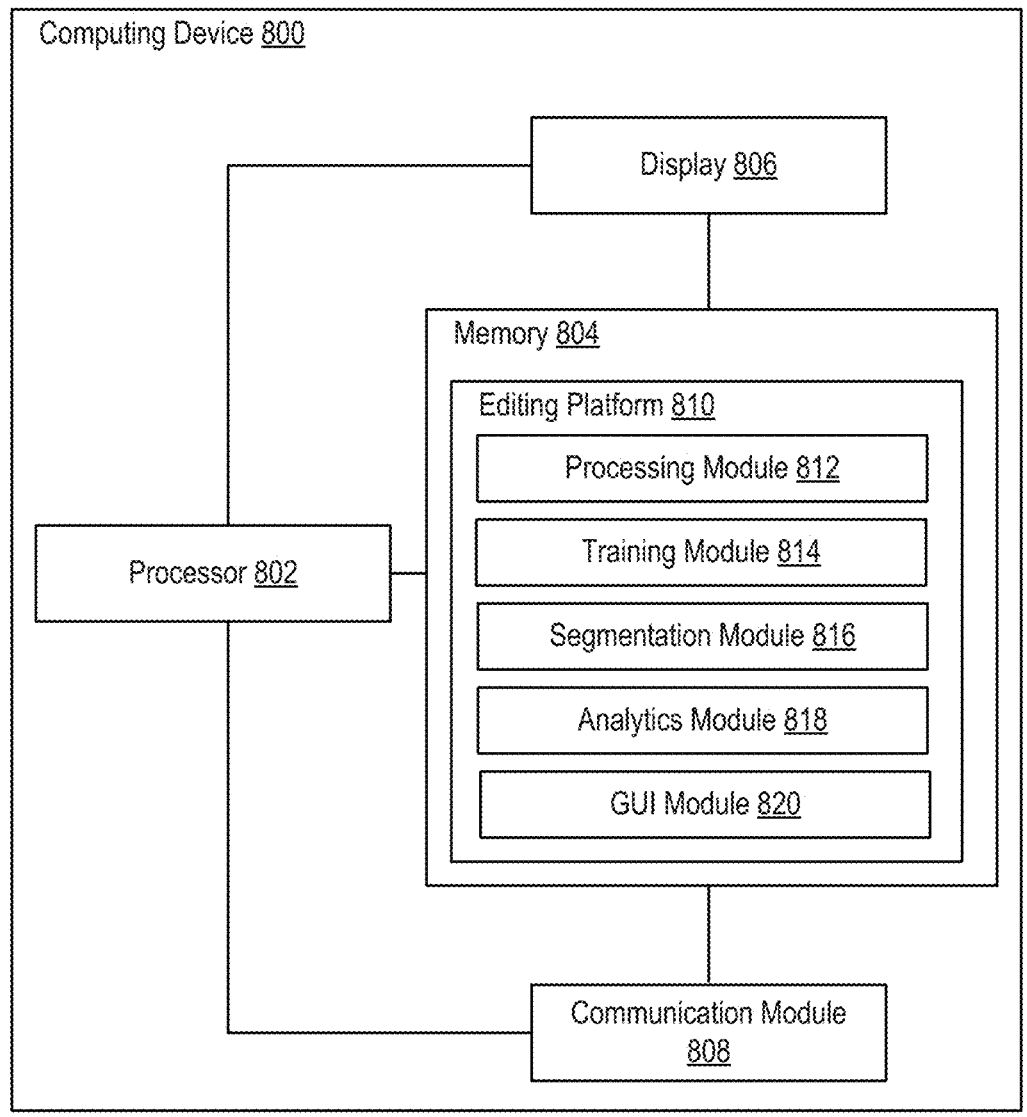
FIG. 8 illustrates an example of a computing device that is capable of implementing the cyclic approaches described herein.

FIG. 8 illustrates an example of a computing device 800 that is capable of implementing the cyclic approaches described herein. Note that the components shown in FIG. 8 are merely illustrative. Components that are well known are not shown for simplicity. Referring to FIG. 8, the computing device 800 may include a processor 802, memory 804, display 806, and communication module 808.

The communication module 808 may be, for example, wireless communication circuitry designed to establish wireless communication channels with other computing devices. Examples of wireless communication circuitry include integrated circuits (also referred to as "chips") configured for Bluetooth, Wi-Fi, NFC, and the like. The processor 802 can have generic characteristics similar to general-purpose processors, or the processor 802 may be an application-specific integrated circuit (ASIC) that provides control functions to the computing device 800. As shown in FIG. 8, the processor 802 can be coupled to all components of the computing device 800, either directly or indirectly, for communication purposes.

The memory 804 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 802, the memory 804 can also store data generated by the processor 802 (e.g., when executing the modules of the editing platform 810). Note that the memory 804 is merely an abstract representation of a storage environment. The memory 804 could be comprised of actual memory chips or modules.

For convenience, the editing platform 810 may be referred to as a computer program that resides within the memory 804. However, the editing platform 810 could be comprised of software, firmware, and/or hardware components implemented in, or accessible to, the computing device 800. In accordance with embodiments described herein, the editing platform 810 may include a processing module 812, training module 814, segmentation module 816, analytics module 818, and graphical user interface (GUI) module 820. These modules can be an integral part of the editing platform 810. Alternatively, these modules can be logically separate from the editing platform 810 but operate "alongside" it. Together, these modules enable the editing platform 810 to implement a cyclic structure while training a network of a segmentation module and then while applying the trained segmentation module.

Initially, the editing platform 810 can obtain (i) a video comprised of frames arranged in a temporal, sequential order and (ii) a reference mask that defines, in a reference frame, a boundary of an object to be located in the other frames. Generally, the reference frame is the first frame in the video, though the reference frame could be another frame. In some embodiments, the reference mask is obtained by the processing module 812 that applies a detection model to the reference frame. In other embodiments, the reference frame is manually defined by an individual through an interface generated by the GUI module 820. For example, the GUI module 820 may cause display of the reference frame on the interface and then record, based on input received through the interface, a definition of the reference mask.

The processing module 812 may be responsible for processing data obtained by the editing platform 810 into a format suitable for the other modules. Said another way, the processing module 812 may be responsible for ensuring that data acquired by the editing platform 810 is made accessible to the other modules. For example, the processing module 812 may apply operations to the video that cause the frames to be upsampled, downsampled, resized, or altered in some other manner.

As discussed above, the video and reference mask may be used to either train or apply a segmentation model in a cyclical manner. The training module 814 may be responsible for accomplishing the former, while the segmentation module 816 may be responsible for accomplishing the latter. In particular, the training module 814 can locate a segmentation model to be trained to identify instances of the object and then train the segmentation model using the video and reference mask. The training stage is further described below with reference to FIGS. 9-10. The segmentation module 816, meanwhile, can identify a segmentation model that has been trained to identify instances of the object and then apply the segmentation model to the frames of the video in a cyclical manner using the reference mask. The segmenting stage (also referred to as the "inference stage") is further described below with reference to FIG. 11.

As discussed above, the segmentation model is designed to generate masks for target frames based on the reference mask defined for the reference frame. In order to determine whether updates of the segmentation model are necessary, the analytics module 818 can compare pairs of masks. Assume, for example, that the segmentation model is applied—by the training module 814 or segmentation module 816—to a target frame to produce a first mask based on inputs that include (i) the reference frame and (ii) the reference mask. Then, the segmentation model may be applied—again, by the training module 814 or segmentation module 816—to the reference frame to produce a second mask based on inputs that include (i) the target frame and (ii) the first mask. The analytics module 818 may be responsible for comparing the second mask to the reference mask and then determining whether the segmentation model should be updated. For example, the network of the segmentation model may be parameterized by weights whose values are determined based on analyses of the second mask and reference mask by the analytics module 818 in a forward temporal order and/or a backward temporal order.

Methodologies for Implementing Cyclic Structure in Segmentation

Figure 9:
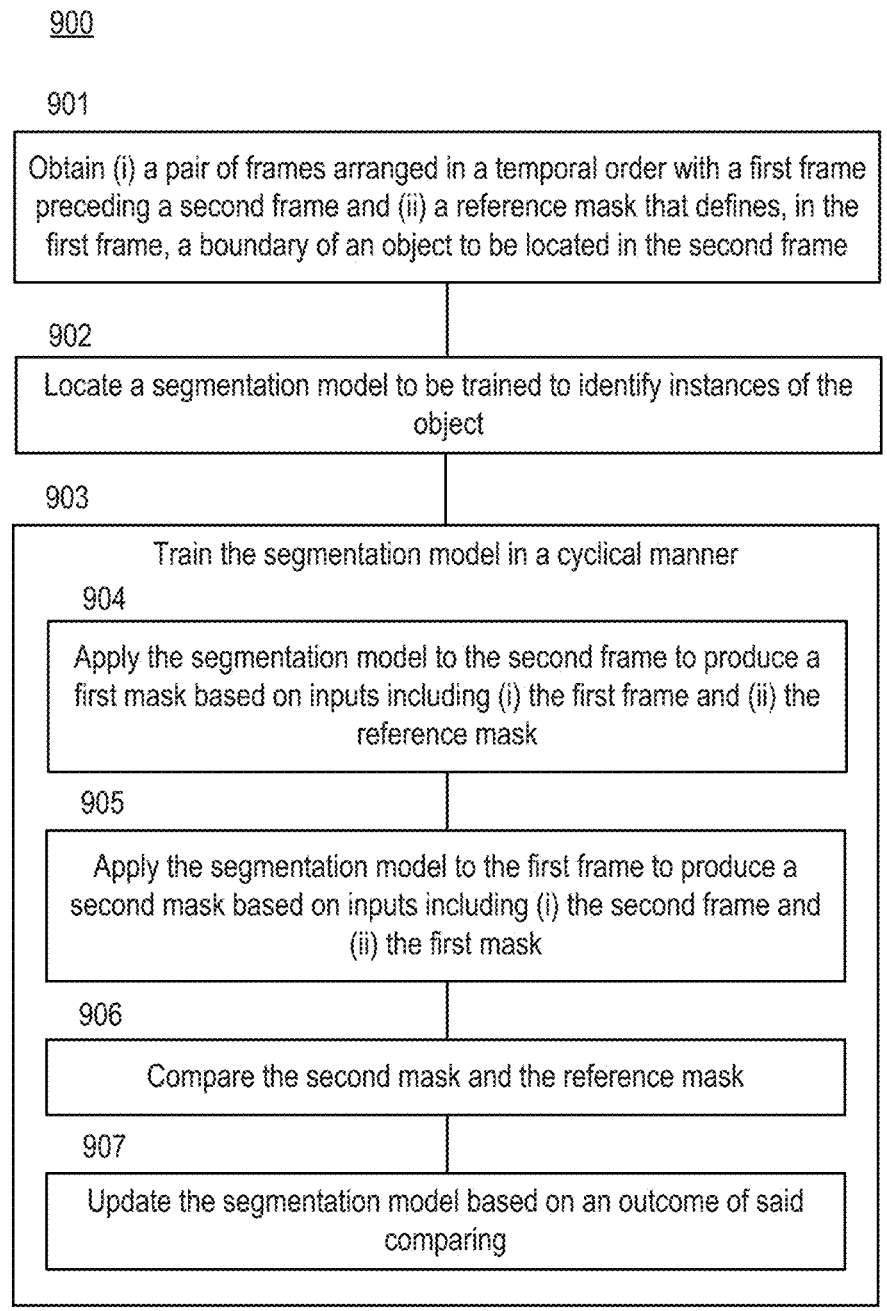
FIG. 9 depicts a flow diagram of a process for semi-supervised offline training of a segmentation model.

FIG. 9 depicts a flow diagram of a process 900 for semi-supervised offline training of a segmentation model. Initially, an editing platform obtains (i) a pair of frames arranged in a temporal order with a first frame preceding a second frame and (ii) a reference mask that defines, in the first frame, a boundary of an object to be located in the second frame (step 901). Generally, the pair of frames are part of a video that includes a series of frames sequentially arranged in a temporal order. Note, however, that the first frame (also referred to as the "reference frame") may not necessarily be the initial frame in the video. In some embodiments, the editing platform is configured to acquire the pair of frames responsive to receiving input indicative of a selection of the video of which the pair of frames are a part. In other embodiments, the editing platform is configured to identify the video based on some other input or action. For example, the editing platform may extract the pair of frames from the video responsive to determining that an individual has accessed a folder or file associated with the video. That is, the editing platform may automatically acquire the pair of frames based on monitoring of activities performed through the editing platform. The reference mask, meanwhile, may be manually defined through an interface generated by the editing platform as discussed above.

Then, the editing platform can locate a segmentation model to be trained to identify instances of the object in the video (step 902). The segmentation model may comprise a network with a multistage architectural design that is parameterized by multiple weights. By training the segmentation model, the editing platform can establish appropriate values for those weights that ensure errors in segmentation are not propagated onward in future frames of the video.

Thereafter, the editing platform can train the segmentation model in a cyclical manner (step 903). In particular, the editing platform can apply the segmentation model to the second frame to produce a first mask based on inputs including (i) the first frame and (ii) the reference mask (step 904) and then apply the segmentation model to the first frame to produce a second mask based on inputs including (i) the second frame and (i) the first mask (step 905). Thus, the editing platform may apply the segmentation model in a forward temporal order and then a backward temporal order. The first mask may be representative of a predicted boundary of the object in the second frame, while the second mask may be representative of a predicted boundary of the object in the first frame. The first and second masks may correspond to contiguous sets of pixels in the second and first frames, respectively.

The second mask is representative of the output predicted by the segmentation model for the first frame for which the reference mask already exists as a ground truth. Thus, the editing platform may compare the second mask and the reference mask (step 906), for example, by determining correspondence between normalized pixel values at corresponding coordinates of those masks. More specifically, the editing platform may compare the second mask and the reference mask by computing a metric indicative of the correspondence between normalized pixel values at the corresponding coordinates of those masks. Then, the editing platform can update the segmentation model based on the comparison (step 907). For example, if the second mask is substantially identical to the reference mask, then no modifications of the segmentation model may be necessary. However, if the second mask and reference mask are dissimilar from one another, then the editing platform may modify the segmentation model in some manner. For example, the editing platform may alter the weights associated with the various stages of the network of the segmentation model.

Those skilled in the art will recognize that the process 900 of FIG. 9 allows training data (here, a pair frames) to be augmented by reversing the temporal order of the frames. If the pair of frames are included in a series of frames representative of a video, the editing platform may train the segmentation model by reversing the series of frames in temporal order. Such an approach allows the segmentation model to learn more general feature correspondence than would be learned if the series of frames were provided in temporal order.

FIG. 10 depicts a flow diagram of a process 1000 for applying a trained segmentation model in a cyclical manner. Initially, an editing platform obtains (i) a pair of frames arranged in a temporal order with a first frame preceding a second frame and (ii) a reference frame that defines, in the first frame, a boundary of an object to be located in the second frame (step 1001). Step 1001 of FIG. 10 may be largely similar to step 901 of FIG. 9. Thereafter, the editing platform can acquire a trained segmentation model. The trained segmentation model may be retrieved from a library of trained segmentation models based on input specifying the object to be located in the second frame. Alternatively, the trained segmentation model may be retrieved from a library of trained segmentation models based on analysis of the reference mask and/or metadata accompanying the reference mask or pair of frames.

The editing platform can then apply the trained segmentation model to the second frame to produce a first mask based on inputs including (i) the first frame and (ii) the reference mask (step 1002) and then apply the segmentation model to the first frame to produce a second mask based on inputs including (i) the second frame and (i) the first mask (step 1003). Steps 1002-1003 of FIG. 10 may be largely similar to steps 904-905 of FIG. 9. Thus, the first mask may be representative of a predicted boundary of the object in the second frame, while the second mask may be representative of a predicted boundary of the object in the first frame.

The editing platform can calculate a metric to quantify similarity between the second mask and the reference mask (step 1004). For example, the editing platform may calculate an IoU score to measure accuracy of the second mask in identifying the object in the first image. Additionally or alternatively, the editing platform may calculate a cross-entropy loss score to measure how well the second mask matches the reference mask. Moreover, the editing platform may establish a correction factor based on the metric (step 1005). Then, the editing platform can apply the correction factor to the first mask to the third mask (step 1006). The third mask may be used in lieu of the first mask for segmentation of the second frame. As such, the editing platform may discard the first mask.

To iteratively improve the quality of the mask produced for the second frame, the editing platform may perform steps 1002-1006 a predetermined number of times. Thus, the editing platform may perform those steps multiple times in succession, each time using the segmentation model as it is iteratively updated. The number of times that those steps may depend on factors such as available resources, desired timeliness, and the like. For this reason, those steps may only be performed 2, 3, or 5 times.

As mentioned above, the pair of frames may be part of a video that is comprised of a series of frames. The process 1000 shown in FIG. 10 may be performed once per N frames, where N is an integer, so as to periodically inhibit propagation of errors, if any, introduced by segmentation. Performing the process 1000 too frequently will require significant resources and may result in slower processing speeds. As such, the process 1000 may be performed every 3, 5, or 10 frames to ensure that segmentations are promptly discovered without overconsuming available resources.

FIG. 11 is a flow diagram of a process 1100 in which a network-based model designed for segmentation is applied in the forward and backward directions to ensure that masks produced by the network-based model are accurate. This process 1100 may be performed by an editing platform during the training stage or inference stage for the network-based model.

Initially, the editing platform produces a first mask by applying the network-based model to a given digital image with (i) a reference digital image and (ii) a reference mask being provided as inputs (step 1101). The reference mask defines, in the reference digital image, a boundary of the object to located in the given digital image. Moreover, the editing platform produces a second mask by applying the network-based model to the reference digital image with (i) the given digital image and (ii) the first mask being provided as inputs (step 1102).

Then, the editing platform can update the network-based model based on a comparison of the second mask and the reference mask (step 1103). As mentioned above, modifications of the network-based model may not be necessary if the second mask substantially matches the reference mask. However, if the second mask and reference mask are dissimilar than one another, the editing platform may modify the network-based model to improve the accuracy of masks generated by the network-based model. As an example, the network-based model is parameterized by weights in some embodiments. In such embodiments, the editing platform may change at least one of the weights to account for differences between the second mask and the reference mask. These weights may be modifiable at runtime as the network-based model is applied to frames of a video of which the reference digital image and given digital image are a part. Accordingly, rather than alter the underlying structure of the network-based model, the editing platform may instead alter the values of those weights.

Unless contrary to physical possibility, it is envisioned that the steps described above may be performed in various sequences and combinations. For instance, the editing platform may execute the process 1100 of FIG. 11 multiple times in succession if the reference digital image and given digital image are frames in a video comprised of multiple frames. Each time that the process 1100 is executed, a different frame of the multiple frames may serve as the given frame so as to iteratively improve the network-based model over the course of the video.

Other steps may also be included in some embodiments. For example, as the processes 900, 1000, 1100 of FIGS. 9-11 are executed, the editing platform may construct reference sets. Assume, for example, that the process 1100 of FIG. 11 is executed multiple times in succession for different frames included in a video. In such a scenario, the editing platform may construct (i) a reference frame set that is comprised of each frame that serves as the given frame and (ii) a reference mask set that is comprised of the masks produced for those frames.

Processing System

Figure 12:
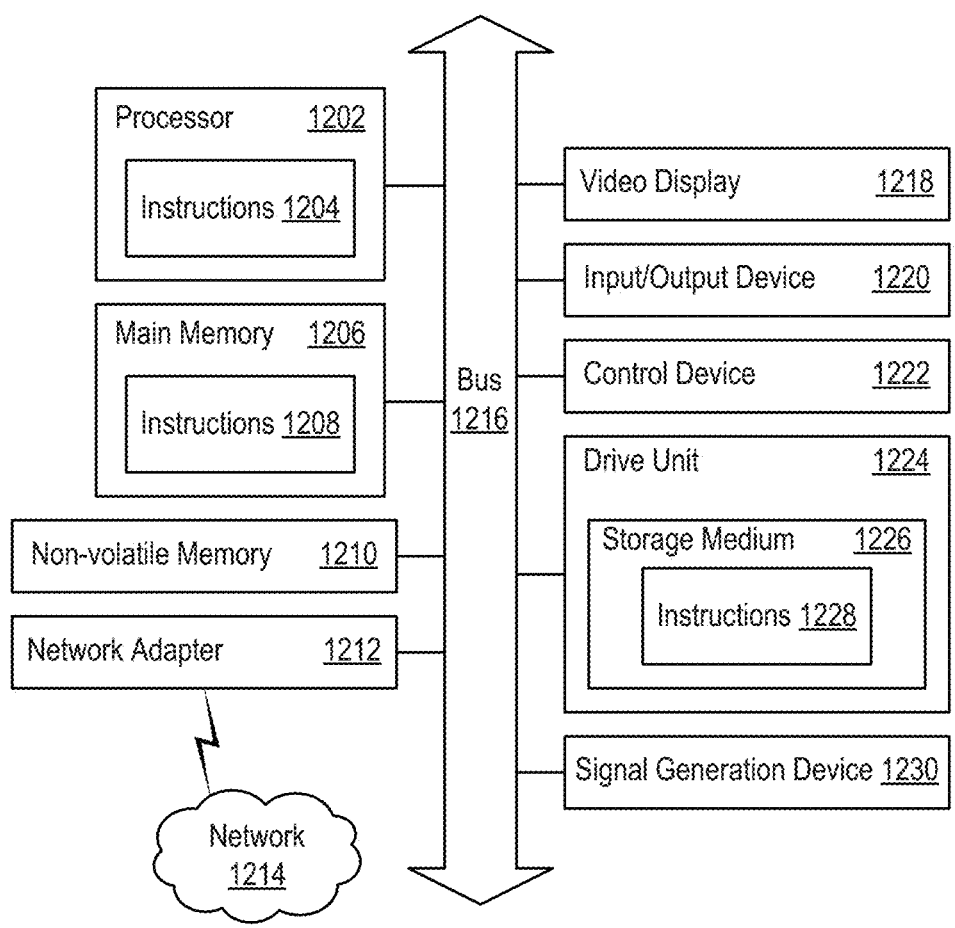
FIG. 12 is a block diagram illustrating an example of a processing system in which at least some operations described herein can be implemented.

FIG. 12 is a block diagram illustrating an example of a processing system 1200 in which at least some operations described herein can be implemented. For example, components of the processing system 1200 may be hosted on a computing device that includes an editing platform (e.g., editing platform 702 of FIG. 7 or editing platform 810 of FIG. 8).

The processing system 1200 may include a processor 1202, main memory 1206, non-volatile memory 1210, network adapter 1212 (e.g., a network interface), video display 1218, input/output device 1220, control device 1222 (e.g., a keyboard, pointing device, or mechanical input such as a button), drive unit 1224 that includes a storage medium 1226, or signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or a bus compliant with Institute of Electrical and Electronics Engineers (IEEE) Standard 1394.

The processing system 1200 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1200.

While the main memory 1206, non-volatile memory 1210, and storage medium 1226 are shown to be a single medium, the terms "storage medium" and "machine-readable medium" should be taken to include a single medium or multiple media that stores one or more sets of instructions 1226. The terms "storage medium" and "machine-readable medium" should also be taken to include any medium that is capable of storing, encoding, or carrying a set of instructions for execution by the processing system 1200.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memories and storage devices in a computing device. When read and executed by the processor 1202, the instructions cause the processing system 1200 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 1210, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 1212 enables the processing system 1200 to mediate data in a network 1214 with an entity that is external to the processing system 1200 through any communication protocol supported by the processing system 1200 and the external entity. The network adapter 1212 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

The techniques introduced here can be implemented using software, firmware, hardware, or a combination of such forms. For example, aspects of the present disclosure may be implemented using special-purpose hardwired (i.e., non-programmable) circuitry in the form of application-specific integrated circuits (ASICs), programmable logic devices (PLDs), field-programmable gate arrays (FPGAs), and the like.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
   obtaining, by a processor, (i) a pair of frames arranged in a temporal order with a first frame preceding a second frame and (ii) a reference mask that defines, in the first frame, a boundary of an object to be located in the second frame; and
   training, by the processor, a segmentation model to identify one or more instances of the object based on—
      applying the segmentation model to the second frame to produce a first mask representative of a predicted boundary of the object in the second frame,
         wherein the segmentation model produces the first mask based on inputs including (i) the first frame and (ii) the reference mask,
      applying the segmentation model to the first frame to produce a second mask representative of a predicted boundary of the object in the first frame,
         wherein the segmentation model produces the second mask based on inputs including (i) the second frame and (ii) the first mask,
      comparing the second mask and the reference mask by determining correspondence at corresponding coordinates of the second mask and the reference mask, and
      updating the segmentation model based on an outcome of said comparing.

2. The method of claim 1, wherein the segmentation model is parameterized by weights, and wherein said updating comprises changing at least one of the weights to account for differences between the second mask and the reference mask.

3. The method of claim 1, further comprising:
   causing display of the first frame on an interface; and
   recording, based on input received through the interface on which the first frame is displayed, a definition of the reference mask.

4. The method of claim 1, wherein said comparing comprises computing a metric indicative of the correspondence between normalized pixel values at the corresponding coordinates of the second mask and the reference mask.

5. The method of claim 1, wherein the segmentation model is parameterized by weights whose values are determined based on analyses of the pair of frames in a forward temporal order and a backward temporal order.

6. The method of claim 1, wherein the first and second masks correspond to contiguous sets of pixels in the second and first frames, respectively.

7. The method of claim 1, wherein the pair of frames are included in a series of frames representative of a video, and wherein the segmentation model is trained by reversing the series of frames in temporal order.

8. The method of claim 1, wherein the pair of frames are included in a series of frames representative of a video, and wherein the series of frames include the first and second frames with at least one frame interposed therebetween.

9. A non-transitory computer-readable medium with instructions stored thereon that, when executed by a processor, cause the processor to perform operations comprising:
   obtaining (i) a pair of frames arranged in a temporal order with a first frame preceding a second frame and (ii) a reference mask that defines, in the first frame, a boundary of an object to be located in the second frame;
   applying a segmentation model to the second frame to produce a first mask representative of a predicted boundary of the object in the second frame,
      wherein the segmentation model produces the first mask based on inputs including (i) the first frame and (ii) the reference mask;
   applying the segmentation model to the first frame to produce a second mask representative of a predicted boundary of the object in the first frame,
      wherein the segmentation model produces the second mask based on inputs including (i) the second frame and (ii) the first mask;
   establishing a correction factor based on a comparison of the second mask and the reference mask; and
   applying the correction factor to the first mask to produce a third mask.

10. The non-transitory computer-readable medium of claim 9, wherein the operations, except for said obtaining, are performed a predetermined number of times to iteratively improve quality of masks produced by the segmentation model for the second frame.

11. The non-transitory computer-readable medium of claim 9, wherein the third mask is used in lieu of the first mask for segmentation of the second frame, and wherein the operations further comprise:
   discarding the first mask.

12. The non-transitory computer-readable medium of claim 9, wherein the pair of frames are part of a video comprised of a series of frames.

13. The non-transitory computer-readable medium of claim 12, wherein the operations are performed periodically based on the number of frames in the video.

14. The non-transitory computer-readable medium of claim 9, wherein the operations further comprise:
   calculating an Intersection over Union (IoU) score to quantify similarity between the second mask and the reference mask;
   wherein the correction factor is based on the IoU score.

15. The non-transitory computer-readable medium of claim 9, wherein the operations further comprise:
   evaluating a cross-entropy loss score to quantify similarity between the second mask and the reference mask;
   wherein the correction factor is based on the cross-entropy loss score.

\* \* \* \* \*